United States Patent
Tobe

(10) Patent No.: US 10,550,763 B2
(45) Date of Patent: Feb. 4, 2020

(54) ENGINE CONTROL APPARATUS

(71) Applicant: SUBARU CORPORATION, Tokyo (JP)

(72) Inventor: Shota Tobe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 88 days.

(21) Appl. No.: 15/884,086

(22) Filed: Jan. 30, 2018

(65) Prior Publication Data

US 2018/0245510 A1 Aug. 30, 2018

(30) Foreign Application Priority Data

Feb. 28, 2017 (JP) ................................. 2017-036903

(51) Int. Cl.
*F02B 77/04* (2006.01)
*F02D 41/40* (2006.01)
(Continued)

(52) U.S. Cl.
CPC ............... *F02B 77/04* (2013.01); *B08B 3/08* (2013.01); *F02D 41/401* (2013.01); *F02B 17/005* (2013.01); *F02M 35/10255* (2013.01)

(58) Field of Classification Search
CPC .... F02D 13/0234; F02D 19/12; F02D 41/401; F02D 2041/001; F02D 2041/389;
(Continued)

(56) References Cited

U.S. PATENT DOCUMENTS 6,892,691 B1    5/2005  Uhl et al.
7,137,377 B2   11/2006  Kerns et al.
                (Continued)

FOREIGN PATENT DOCUMENTS

CN        1376239 A    10/2002
CN      205001069 U     1/2016
                (Continued)

OTHER PUBLICATIONS

Japanese Office Action, dated Jul. 31, 2018, in Japanese Application No. 2017-036903 and English Translation thereof.
(Continued)

*Primary Examiner* — Benjamin L Osterhout
(74) *Attorney, Agent, or Firm* — McGinn I. P. Law Group, PLLC

(57) ABSTRACT

An engine control apparatus is configured to control a direct injection engine that includes a combustion chamber and an intake system including an intake port. The engine control apparatus includes a cleaning component sensor and a mode controller. The cleaning component sensor is provided in a fuel system and configured to detect a cleaning component included in fuel. The fuel system includes a fuel tank and an injector and is configured to supply the fuel to the combustion chamber. The mode controller is configured to cause execution of a cleaning mode by the direct injection engine, under a state in which the cleaning component included in the fuel is higher than a threshold. The cleaning mode includes increasing an amount of a fuel-air mixture flowing back from the combustion chamber to the intake port.

5 Claims, 5 Drawing Sheets

(51) Int. Cl.
*B08B 3/08* (2006.01)
*F02B 17/00* (2006.01)
*F02M 35/10* (2006.01)

(58) Field of Classification Search
CPC .............. F02D 2200/0406; F02B 77/04; F02B 2075/125; F02B 17/005; B08B 3/08; B08B 9/00; Y02T 10/44; Y02T 10/18; F02M 35/10255
See application file for complete search history.

(56) References Cited

U.S. PATENT DOCUMENTS

| | | | |
|---|---|---|---|
| 2008/0233656 A1 | 9/2008 | Karl et al. | |
| 2008/0283100 A1* | 11/2008 | Ogasawara | B08B 9/00 134/111 |
| 2008/0295492 A1* | 12/2008 | Karkkainen | F01N 3/025 60/286 |
| 2009/0299610 A1* | 12/2009 | Kumano | F02D 13/0203 701/105 |
| 2010/0012081 A1* | 1/2010 | Ashizawa | F02B 23/101 123/301 |
| 2013/0060452 A1 | 3/2013 | Saruwatari et al. | |
| 2014/0200796 A1* | 7/2014 | Bidner | F02D 19/12 701/111 |
| 2016/0123254 A1 | 5/2016 | Burleigh et al. | |
| 2016/0131048 A1* | 5/2016 | Surnilla | F02D 41/0025 701/104 |
| 2017/0241335 A1 | 8/2017 | Liu | |
| 2017/0306892 A1* | 10/2017 | Kraemer | F02M 25/028 |
| 2017/0356359 A1* | 12/2017 | Glugla | F02D 41/221 |

FOREIGN PATENT DOCUMENTS

| | | |
|---|---|---|
| CN | 105569845 A | 5/2016 |
| JP | 2001-289097 A | 10/2001 |
| JP | 2004-251155 A | 9/2004 |
| JP | 4144372 B2 | 9/2008 |
| JP | 2008-274801 A | 11/2008 |
| JP | 2009-503526 A | 1/2009 |
| JP | 2013-053598 A | 3/2013 |

OTHER PUBLICATIONS

Chinese Office Action, dated Feb. 2, 2019, in Chinese Application No. 201810063295 and English Translation thereof.
JPO Decision to Grant a Patent dated Oct. 23, 2018, and English Translation thereof.

* cited by examiner

ENGINE CONTROL APPARATUS

CROSS-REFERENCE TO RELATED APPLICATIONS

The present application claims priority from Japanese Patent Application No. 2017-036903 filed on Feb. 28, 2017, the entire contents of which are hereby incorporated by reference.

BACKGROUND

The technology relates to an engine control apparatus that cleans a deposit generated in an intake system.

A deposit lay on an intake port or an intake valve of an engine. The deposit is carbide or oxide of, for example, fuel or engine oil. Because the deposit laid in a large amount on, for example, the intake port may influence an operation state of the engine, pursuits have been made for removal of the deposit from the intake system. For example, Japanese Unexamined Patent Application Publication (JP-A) No. 2001-289097 has made a proposal for a control apparatus that flows back fuel from a combustion chamber to an intake port, by changing injection timing of the fuel in units of predetermined travel distances. The control apparatus described in JP-A No. 2001-289097 positively attaches the fuel to the intake system, allowing the fuel to clean the deposit on the intake system.

SUMMARY

In order to clean the deposit on the intake system, a cleaning fluid has been developed that is used in mixture with the fuel in a fuel tank. Flowing back the fuel including the cleaning fluid to the intake system makes it possible to remove the deposit on the intake system. However, flowing back the fuel devoid of the cleaning fluid to the intake system may cause an increase in the deposit on the intake system. In other words, because the fuel such as gasoline is also a generation source of the deposit, flowing back the fuel devoid of the cleaning fluid to the intake system may cause an increase in the generation source and the increase in the deposit. Accordingly, there is a request for appropriate execution of a cleaning mode, in order to suppress the increase in the deposit on the intake system.

It is desirable to provide an engine control apparatus that makes it possible to appropriately execute a cleaning mode.

An aspect of the technology provides an engine control apparatus configured to control a direct injection engine. The direct injection engine includes a combustion chamber and an intake system, is able to execute a cleaning mode, and is configured to inject fuel into the combustion chamber. The intake system includes an intake port that is in communication with the combustion chamber. The cleaning mode includes cleaning a deposit in the intake system. The engine control apparatus includes a cleaning component sensor and a mode controller. The cleaning component sensor is provided in a fuel system and configured to detect a cleaning component included in the fuel. The fuel system includes a fuel tank and an injector and is configured to supply the fuel to the combustion chamber. The mode controller is configured to cause execution of the cleaning mode by the direct injection engine, under a state in which the cleaning component included in the fuel is higher than a threshold. The cleaning mode includes increasing an amount of a fuel-air mixture flowing back from the combustion chamber to the intake port.

An aspect of the technology provides an engine control apparatus that controls a direct injection engine. The direct injection engine includes a combustion chamber and an intake system, is able to execute a cleaning mode, and is configured to inject fuel into the combustion chamber. The intake system includes an intake port that is in communication with the combustion chamber. The cleaning mode includes cleaning a deposit in the intake system. The engine control apparatus includes a cleaning component sensor and circuitry. The cleaning component sensor is provided in a fuel system and configured to detect a cleaning component included in the fuel. The fuel system includes a fuel tank and an injector and is configured to supply the fuel to the combustion chamber. The circuitry is configured to cause execution of the cleaning mode by the direct injection engine, under a state in which the cleaning component included in the fuel is higher than a threshold. The cleaning mode includes increasing an amount of a fuel-air mixture flowing back from the combustion chamber to the intake port.

DETAILED DESCRIPTION

In the following, some non-limiting implementations of the technology are described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale.

Figure 1:
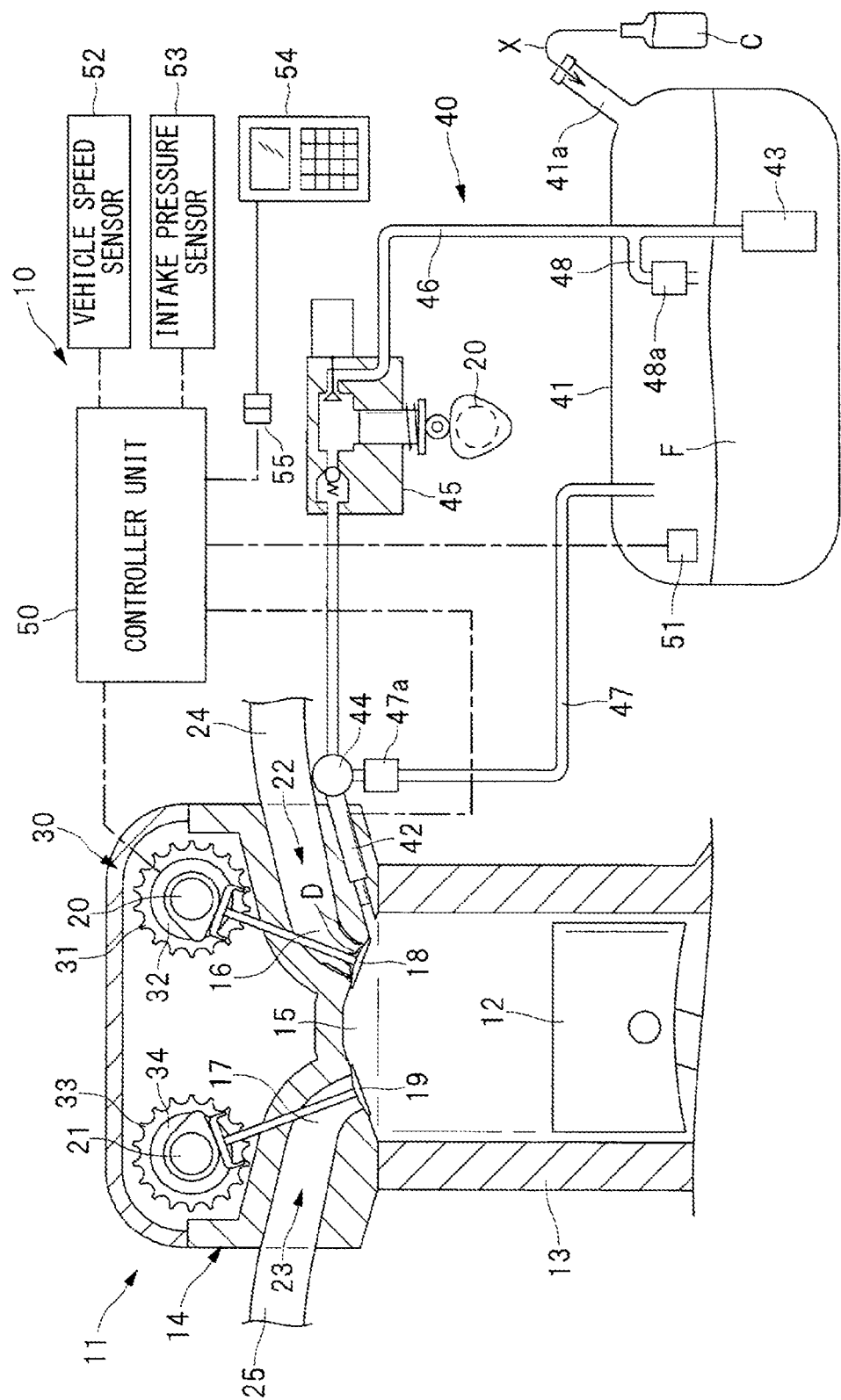
FIG. 1 illustrates an example of an outline of an engine to which an engine control apparatus according to one implementation of the technology is applied.

FIG. 1 illustrates an example of an outline of an engine 11 to which an engine control apparatus 10 according to one implementation of the technology is applied. Referring to FIG. 1, the engine 11 may include a cylinder block 13 and a cylinder head 14 mounted on the cylinder block 13. The cylinder block 13 may contain a piston 12. The cylinder head 14 may be provided with an intake port 16 and an exhaust port 17 that are both in communication with a combustion chamber 15. The cylinder head 14 may be also provided with an intake valve 18 and an exhaust valve 19. The intake valve 18 may cause the intake port 16 to be open or closed. The exhaust valve 19 may cause the exhaust port 17 to be open or closed. Further, the cylinder head 14 may include an intake cam shaft 20 and an exhaust cam shaft 21. The intake cam shaft 20 may drive the intake valve 18. The exhaust cam shaft 21 may drive the exhaust valve 19. Thus, the engine 11 may include an intake system 22 and an exhaust system 23. The intake system 22 may include, for example, the intake port 16 and the intake valve 18. The exhaust system 23 may include, for example, the exhaust port 17 and the exhaust valve 19. Further, the intake port 16 of the cylinder head 14 may be coupled to an intake tube 24. The exhaust port 17 of the cylinder head 14 may be coupled to an exhaust tube 25.

The engine 11 may further include a variable valve mechanism 30 that controls open and close timing of the intake valve 18 and the exhaust valve 19. The variable valve mechanism 30 may include an intake actuator 32 and an exhaust actuator 34. The intake actuator 32 may be provided between the intake cam shaft 20 and an intake sprocket 31. The exhaust actuator 34 may be provided between the exhaust cam shaft 21 and an exhaust sprocket 33. Driving the intake actuator 32 to cause relative rotary movement of the intake cam shaft 20 and the intake sprocket 31 makes it possible to control the open and close timing of the intake valve 18 to advance angle side or retard angle side. Similarly, driving the exhaust actuator 34 to cause relative rotary movement of the exhaust cam shaft 21 and the exhaust sprocket 33 makes it possible to control the open and close timing of the exhaust valve 19 to the advance angle side or the retard angle side. It is to be noted that the intake actuator 32 and the exhaust actuator 34 may each be either a hydraulic actuator or an electric actuator.

The engine 11 may further include a fuel system 40 that supplies fuel to the combustion chamber 15. The fuel system 40 includes a fuel tank 41 and an injector 42. The fuel tank 41 may store the fuel such as gasoline. The injector 42 may inject the fuel into the combustion chamber 15. The fuel system 40 may further include a low-pressure pump 43 and a high-pressure pump 45. The low-pressure pump 43 may be provided inside the fuel tank 41. The high-pressure pump 45 may be coupled to a delivery pipe 44 of the injector 42.

The low-pressure pump 43 and the high-pressure pump 45 may be coupled to each other with a fuel duct 46 in between. Thus, the fuel inside the fuel tank 41 may be supplied to the injector 42 via the low-pressure pump 43 and the high-pressure pump 45. As described above, the engine 11 illustrated by way of example in FIG. 1 is a direct injection engine, i.e., a cylinder injection engine that injects the fuel into the combustion chamber 15. Moreover, in the injector 42, an undepicted solenoid valve may be incorporated. The solenoid valve may open and close a nozzle. Driving the solenoid valve makes it possible to control injection timing of the fuel. It is to be noted that the delivery pipe 44 may be coupled to a return duct 47 provided with a regulator valve 47*a*. Further, the fuel duct 46 may be coupled to a branched duct 48 provided with a regulator valve 48*a*.

[Cleaning of Deposit]

As illustrated in FIG. 1, a deposit D may be accumulated on the intake port 16 and the intake valve 18 that constitute the intake system 22. The deposit D may be carbide or oxide of, for example, the fuel or engine oil. In order to clean the deposit D to remove the deposit D from the intake system 22, dealers or maintenance facilities, without limitation, provide a service of injecting a cleaning fluid C for deposit, as denoted by an arrow X, into the fuel tank 41 through an oil filler port 41*a* on a regular basis. This service makes it possible to mix the cleaning fluid C with the fuel F inside the fuel tank 41, and to allow the cleaning fluid C to be injected from the injector 42 together with the fuel F. Thus, it is possible to soak the deposit D in the cleaning fluid C, and to remove the deposit D. The cleaning fluid C may include, for example but not limited to, a cleaning component such as polyisobutene amine (PIBA), polyether amine (PEA), a surfactant, diethyl glycol, monobutyl ether, polyoxyethylene, and nonylphenyl ether. The surfactant may be, for example but not limited to, an anionic surfactant, a cationic surfactant, an amphoteric surfactant, or a non-ionic surfactant.

Because the engine 11 illustrated by way of example in FIG. 1 is the direct injection engine, in order to effectively remove the deposit D on the intake system 22, it is important to guide the fuel injected into the combustion chamber 15 toward the intake port 16. In other words, it is desired to increase an amount of a fuel-air mixture flowing back from the combustion chamber 15 to the intake port 16 (hereinafter referred to as a "flow-back amount"), and thereby attach more cleaning fluid to the deposit D on the intake system 22. Accordingly, the engine control apparatus 10 further includes a controller unit 50, in order to cause execution of a cleaning mode. The cleaning mode includes increasing the flow-back amount to clean the deposit D. The controller unit 50 may include, for example but not limited to, a microcomputer. As described later, the controller unit 50 may determine conditions of the execution of the cleaning mode on the basis of detection signals from various sensors. If the conditions of the execution are satisfied, the controller unit 50 may switch from a normal mode to the cleaning mode, and control the engine 11. In one implementation of the technology, the controller unit 50 may serve as a "mode controller".

Non-limiting examples of the various sensors to be coupled to the controller unit 50 may include a cleaning component sensor 51, a vehicle speed sensor 52, and an intake pressure sensor 53. The cleaning component sensor 51 may detect a cleaning component concentration, i.e., a concentration of the cleaning component included in the fuel inside the fuel tank 41. The vehicle speed sensor 52 may detect a vehicle speed, i.e., a traveling speed of a vehicle. The intake pressure sensor 53 may detect intake tube pressure, i.e., intake air pressure inside the intake tube 24. Moreover, the controller unit 50 may include an input port 55 to which a terminal device 54 is to be coupled. The terminal device 54 may be used by, for example, the dealers. As described later, in a case where the cleaning fluid is injected into the fuel tank 41 by, for example, the dealers, information on the injection of the cleaning fluid into the fuel tank 41 may be written to the controller unit 50 with the utilization of the terminal device 54.

[Normal Mode and Cleaning Mode]

Figure 2A:
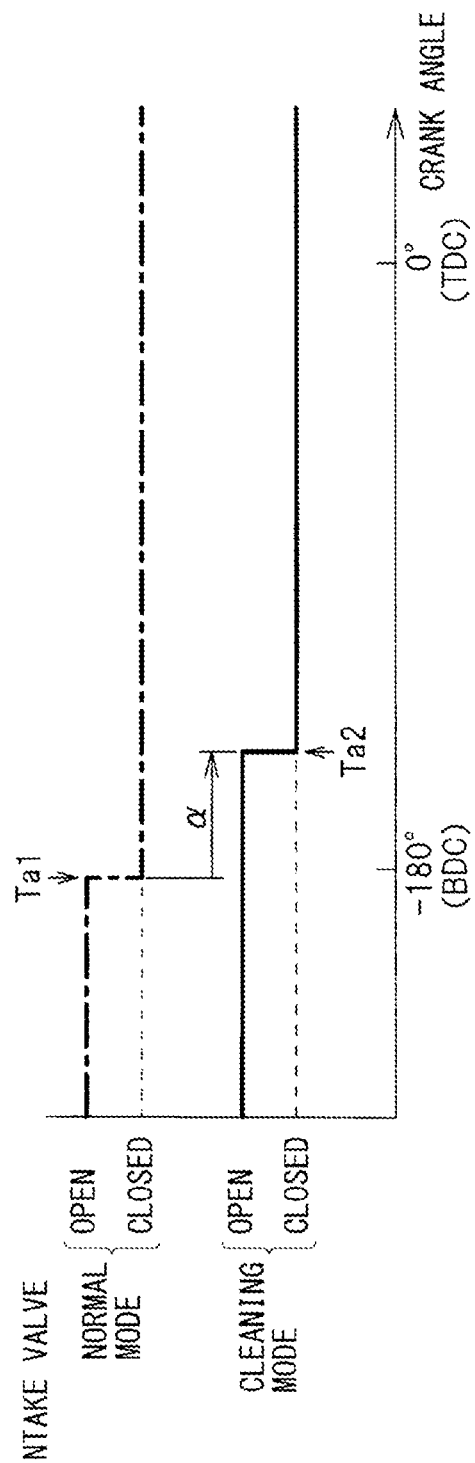
FIG. 2A illustrates operation states of an intake valve in a normal mode and a cleaning mode.
Figure 2B:
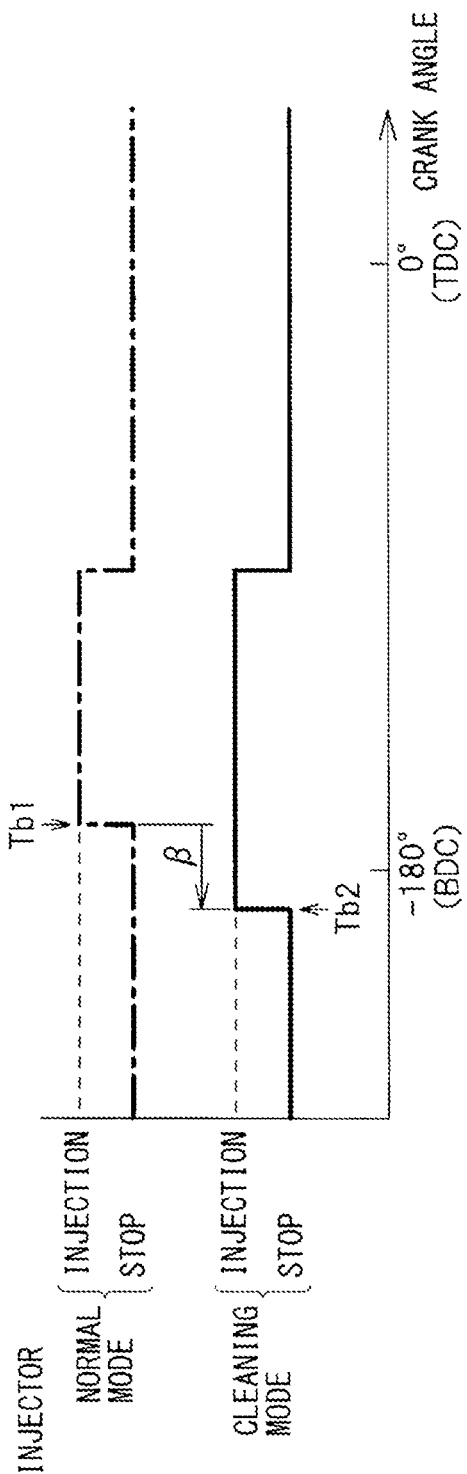
FIG. 2B illustrates operation states of an injector in the normal mode and the cleaning mode.
Figure 3A:
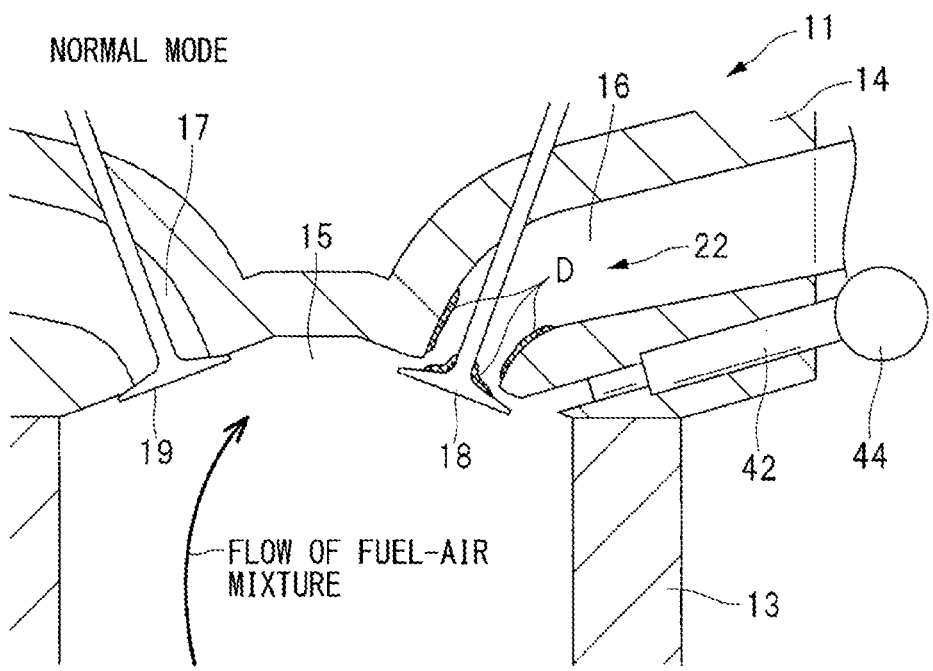
FIG. 3A illustrates an operation state of an engine in the normal mode.
Figure 3B:
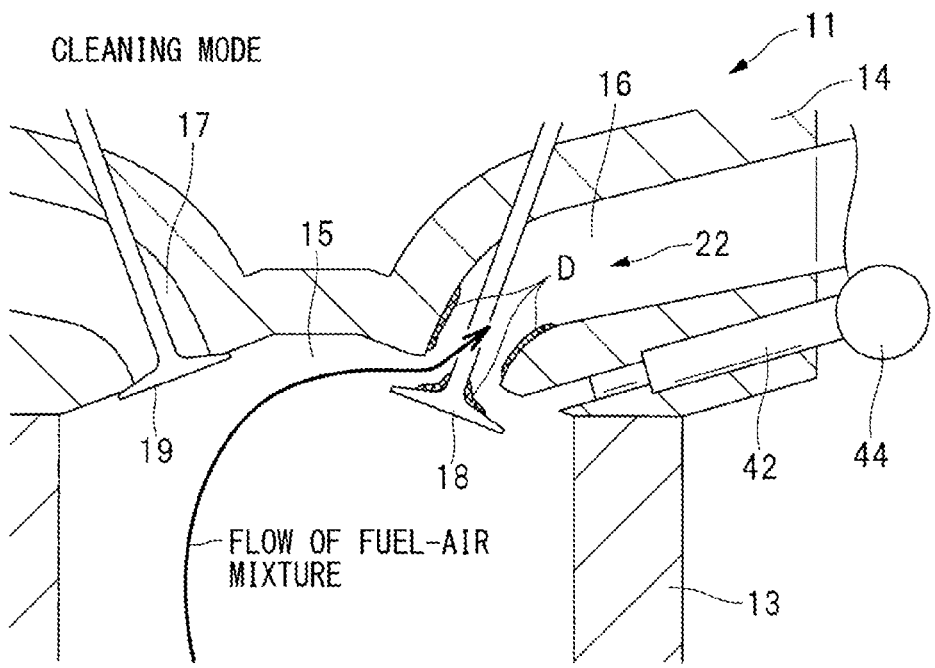
FIG. 3B illustrates an operation state of the engine in the cleaning mode.

FIG. 2A illustrates operation states of the intake valve 18 in the normal mode and the cleaning mode. FIG. 2B illustrates operation states of the injector 42 in the normal mode and the cleaning mode. FIGS. 2A and 2B illustrate a state of a transition from an intake stroke to a compression stroke. In FIGS. 2A and 2B, BDC is an abbreviation of a bottom dead center of the piston 12, and TDC is an abbreviation of a top dead center of the piston 12. FIG. 3A illustrates an operation state of the engine 11 in the normal mode. FIG. 3B illustrates an operation state of the engine 11 in the cleaning mode. FIGS. 3A and 3B illustrate a state immediately before an end of the intake stroke.

As illustrated in FIG. 2A, in a case where the normal mode has been executed, the intake valve 18 may be closed at timing Ta1. In a case where the cleaning mode has been executed, the intake valve 18 may be closed at timing Ta2 later than the timing Ta1. In other words, as denoted by a character a, the close timing Ta2 in the cleaning mode of the intake valve 18 may be controlled by the controller unit 50 and the variable valve mechanism 30, to be postponed from the close timing Ta1 in the normal mode. In a case where the cleaning mode has been executed, with the close timing of the intake valve 18 being postponed, as illustrated in FIGS. 3A and 3B, it is possible to open the intake valve 18 wider in a final stage of the intake stroke than in the normal mode. Hence, it is possible to increase the flow-back amount in the cleaning mode, as compared to the normal mode.

Moreover, as illustrated in FIG. 2B, in the case where the normal mode has been executed, injection of the fuel by the injector 42 may be started at timing Tb1. In the case where the cleaning mode has been executed, the injection of the fuel by the injector 42 may be started at timing Tb2 earlier than the timing Tb1. In other words, as denoted by a character β, the start timing Tb2 of the injection of the fuel in the cleaning mode may be controlled by the controller unit 50 and the injector 42, to be advanced from the start timing Tb1 in the normal mode. In a case where the cleaning mode has been executed, with the start timing of the injection of the fuel being advanced, as illustrated in FIGS. 3A and 3B, it is possible to allow the fuel-air mixture to reach the intake port 16 earlier in the final stage of the intake stroke than in the normal mode. Hence, it is possible to increase the flow-back amount in the cleaning mode, as compared to the normal mode.

As described, in the cleaning mode, postponing the close timing of the intake valve 18 and/or advancing the start timing of the injection of the fuel makes it possible to increase the flow-back amount of the fuel-air mixture heading toward the intake port 16, and to increase an amount of the fuel heading from the combustion chamber 15 toward the intake port 16. It is, therefore, possible for the direct injection engine 11 to guide the cleaning fluid to the intake port 16 or the intake valve 18. Hence, it is possible to attach more cleaning fluid to the deposit D on the intake system 22, and to effectively clean the deposit D and remove the deposit D from the intake system 22.

[Flowchart]

Figure 4:
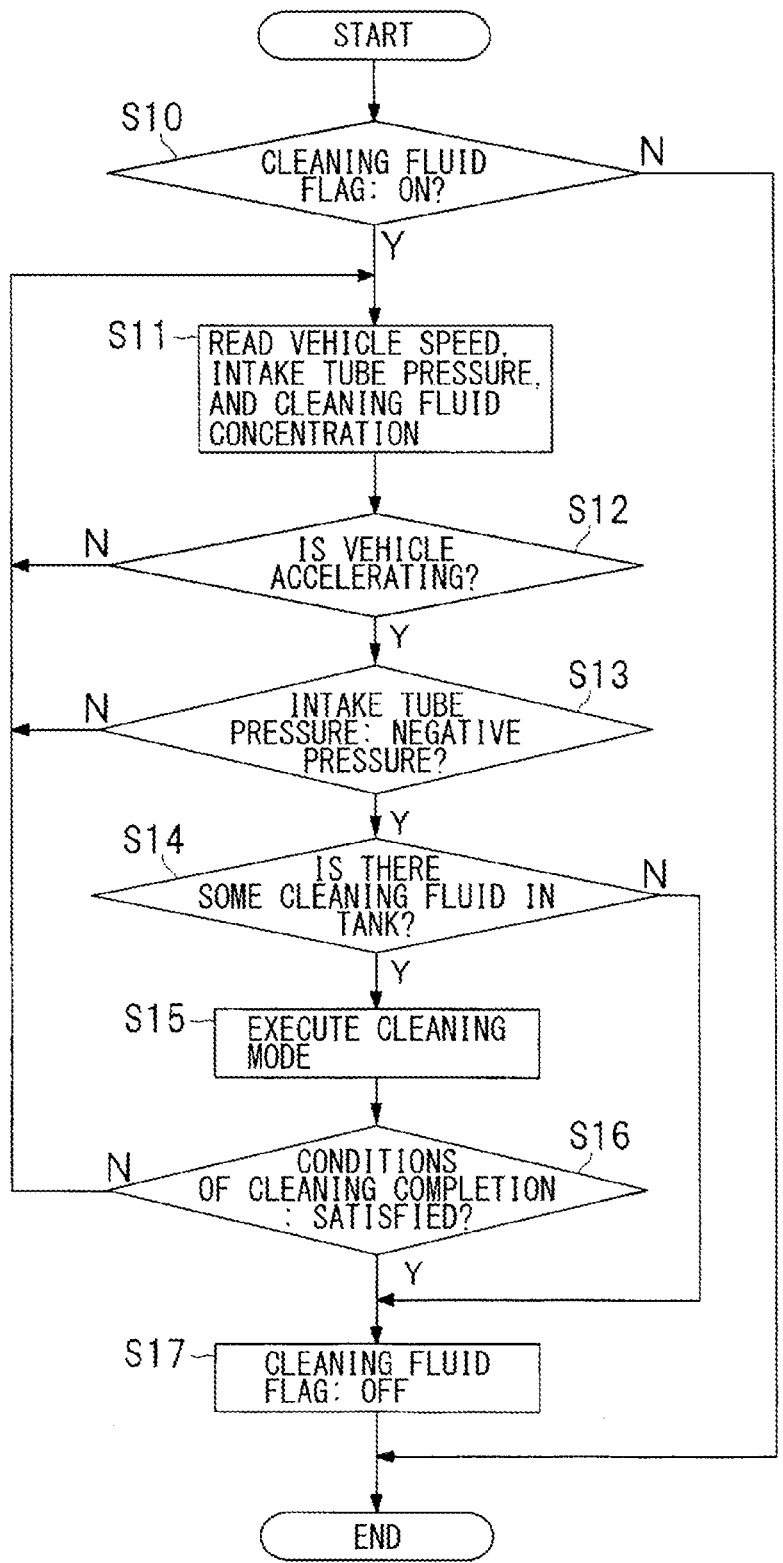
FIG. 4 is a flowchart illustrating an example of a procedure for executing the cleaning mode.

Description is given next of a procedure for executing the cleaning mode as mentioned above, with reference to a flowchart. FIG. 4 is a flowchart of an example of the procedure for executing the cleaning mode. Referring to FIG. 4, in step S10, a determination may be made as to whether or not a cleaning fluid flag is ON. Here, the cleaning fluid flag may be a flag to be written to the controller unit 50 with the utilization of the terminal device 54, and a flag to be written when, for example, the dealers inject the cleaning fluid into the fuel tank 41. In step S10, in a case where a determination is made that the cleaning fluid flag is ON (S10Y), i.e., in a case where the cleaning fluid has been injected into the fuel tank 41, the flow may proceed to step S11. In step S11, detection data such as the vehicle speed, the intake tube pressure, and the cleaning fluid concentration may be read in the controller unit 50.

In step S10, in a case where a determination is made that the cleaning fluid flag is not ON (S10N), i.e., in a case where the cleaning fluid has not been injected into the fuel tank 41, the flow may be terminated without executing the cleaning mode (END).

In step S12, as one of the conditions of the execution of the cleaning mode, a determination may be made, on the basis of the vehicle speed, as to whether or not the vehicle is accelerating. In step S12, in a case where a determination is made that the vehicle is accelerating (S12Y), the flow may proceed to step S13. In step S13, as one of the conditions of the execution of the cleaning mode, a determination may be made as to whether or not the intake tube pressure is negative pressure. As mentioned, executing the cleaning mode may be increasing the flow-back amount from the combustion chamber 15 to the intake port 16, which causes, for example, a lowered output of the engine 11. Therefore, in order to keep an occupant from feeling strange, the cleaning mode may be executed under a state in which the engine 11 is driven stably.

In other words, in a case where in step S12, a determination is made that the vehicle is accelerating, and in step S13, a determination is made that the intake tube pressure is the negative pressure (S13Y), the flow may proceed to step S14. In step S14, a further determination of the conditions of the execution may be made, in order to execute the cleaning mode. Meanwhile, in a case where in step S12, a determination is made that the vehicle is not accelerating (S12N), or in a case where in step S13, a determination is made that the intake tube pressure is positive pressure (S13N), the flow may return to step S11, without proceeding to step S14. In step S11, the detection data such as the vehicle speed, the intake tube pressure, and the cleaning fluid concentration may be newly read.

In step S14, as one of the conditions of the execution of the cleaning mode, a determination may be made, on the basis of the cleaning fluid concentration, as to whether or not there is some cleaning fluid inside the fuel tank 41. In a case where the cleaning fluid concentration is higher than a predetermined threshold, a determination may be made as to presence of the cleaning fluid inside the fuel tank 41. In a case where the cleaning fluid concentration is lower than the predetermined threshold, a determination may be made as to absence of the cleaning fluid inside the fuel tank 41. In step S14, in the case where the determination has been made as to the presence of the cleaning fluid inside the fuel tank 41 (S14Y), the flow may proceed to step S15. In step S15, the close timing of the intake valve 18 may be postponed, and the start timing of the injection of the fuel may be advanced. This causes a control mode of the engine 11 to be switched from the normal mode to the cleaning mode. Thus, the flow-back amount from the combustion chamber 15 to the intake port 16 increases, making it possible to clean the deposit on the intake system 22 and remove the deposit.

Thereafter, in step S16, a determination may be made as to whether or not conditions of cleaning completion of the deposit have been satisfied. In step S16, a case where the conditions of the cleaning completion are satisfied means, for example, a case where a combustion frequency during the execution of the cleaning mode is larger than a predetermined value, or a case where an amount of the injection of the fuel during the execution of the cleaning mode is larger than a predetermined value. In step S16, in a case where a determination is made that the conditions of the cleaning completion have been satisfied (S16Y), the flow may proceed to step S17. In step S17, the cleaning fluid flag may be rewritten as OFF, and the routine may be terminated (END). In step S16, in a case where a determination is made that the conditions of the cleaning completion have not been satisfied (S16N), the flow may return to step S11. In step S11, the detection data such as the vehicle speed, the intake tube pressure, and the cleaning fluid concentration may be updated, and the execution of the cleaning mode may be continued in accordance with the steps as mentioned above.

In step S14, in a case where a determination is made as to the absence of the cleaning fluid inside the fuel tank 41 (S14N), the flow may proceed to step S17. In step S17, the cleaning fluid flag may be rewritten as OFF, and the routine may be terminated (END). In other words, in the case with the absence of the cleaning fluid inside the fuel tank 41, the routine may be terminated, with the normal mode being maintained, without executing the cleaning mode, even if the cleaning fluid flag is ON. As described, in the case with the absence of the cleaning fluid inside the fuel tank 41, the execution of the cleaning mode may be prohibited, making it possible to prevent solely the fuel devoid of the cleaning fluid from being flown at the intake system 22. Hence, it is possible to suppress attachment of the fuel to the intake system 22, and to suppress accumulation of the deposit on the intake system 22.

Figure 5:
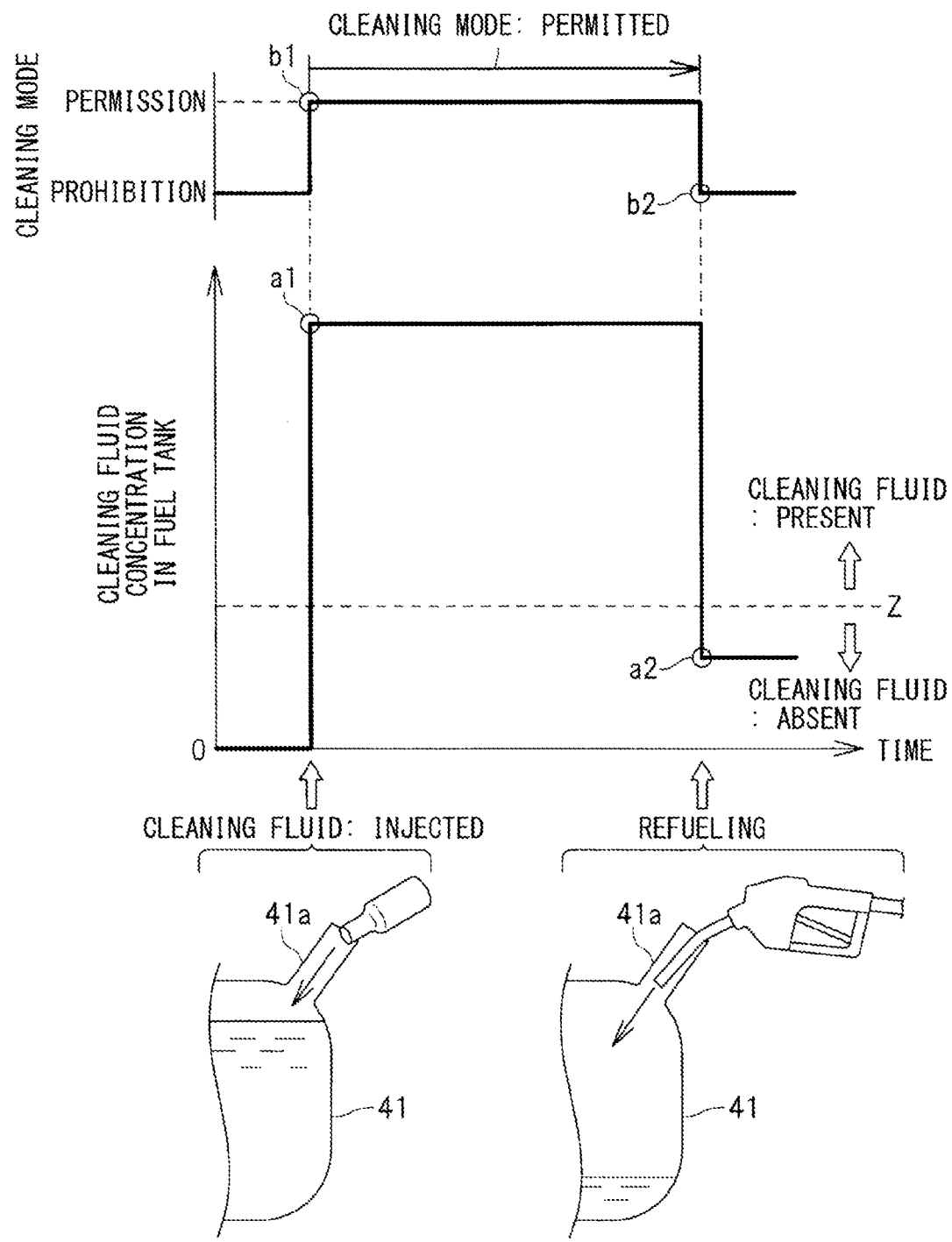
FIG. 5 illustrates relation of transitions of a cleaning fluid concentration to permission of the cleaning mode.

FIG. 5 illustrates relation of transitions of the cleaning fluid concentration to permission of the cleaning mode. Referring to FIG. 5, in a case where the injection of the cleaning fluid into the fuel inside the fuel tank 41, causing the cleaning fluid concentration to be higher than a threshold Z (characters a1), the execution of the cleaning mode may be permitted (characters b1). Thereafter, in a case where the fuel is newly supplied to inside the fuel tank 41, causing the cleaning fluid concentration to be lower than the threshold Z (characters a2), the execution of the cleaning mode may be prohibited (characters b2). Thus, the execution of the cleaning mode may be permitted, under a state with the presence of the cleaning fluid inside the fuel tank 41, i.e., a state in which the cleaning component included in the fuel is higher than a threshold. Hence, it is possible to execute the cleaning mode appropriately.

Although some implementations of the technology have been described in the forgoing with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

In the forgoing description, the cleaning mode may be executed by postponing the close timing of the intake valve 18 and advancing the start timing of the injection of the fuel. However, this is non-limiting. For example, the cleaning mode may be executed solely by postponing the close timing of the intake valve 18, or alternatively, the cleaning mode may be executed solely by advancing the start timing of the injection of the fuel. Moreover, in the example illustrated in FIG. 2B, stop timing of the injection of the fuel in the normal mode and in the cleaning mode may coincide with each other. However, this is non-limiting. The stop timing of the injection of the fuel in the normal mode and in the cleaning mode may be shifted from each other.

In the example illustrated in FIG. 1, the cleaning component sensor 51 may be disposed inside the fuel tank 41. However, this is non-limiting. The cleaning component sensor 51 may be disposed on, for example, the delivery pipe 44 or the fuel duct 46 that constitute the fuel system 40. Moreover, in the example illustrated in FIG. 5, a value larger than zero (0) may be set as the threshold Z for the determination of the presence or the absence of the cleaning fluid. However, this is non-limiting. The threshold Z may be set at zero (0). Furthermore, the cleaning component sensor 51 is not limited to a sensor that detects the cleaning fluid concentration. The cleaning component sensor 51 may be a sensor that detects presence or absence of the cleaning component.

In the forgoing description, the cleaning fluid flag may be written to the controller unit 50 with the utilization of the terminal device 54. However, this is non-limiting. The cleaning fluid flag may be set on the basis of the detection data of the cleaning component sensor 51, or alternatively, the cleaning mode may be executed without using the cleaning fluid flag. In addition, in the forgoing description, the conditions of the execution of the cleaning mode may be, for example, that the vehicle is accelerating, and/or that the intake tube pressure is the negative pressure. However, this is non-limiting. The determination as to whether or not to execute the cleaning mode may be made on the basis of, for example, an engine speed and/or an engine output.

The controller unit 50 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller unit 50. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the controller unit 50 illustrated in FIG. 1.

The invention claimed is:

1. An engine control apparatus configured to control a direct injection engine, the direct injection engine including a combustion chamber and an intake system, being able to execute a cleaning mode, and being configured to inject a fuel into the combustion chamber, the intake system including an intake port that is in communication with the combustion chamber, and the cleaning mode including cleaning a deposit in the intake system, the engine control apparatus comprising:
    a cleaning component sensor provided in a fuel system and configured to detect a cleaning component included in the fuel, the fuel system including a fuel tank and an injector, and being configured to supply the fuel with the cleaning component therein to the combustion chamber; and
    a mode controller configured to cause execution of the cleaning mode by the direct injection engine, under a state in which the cleaning component included in the fuel is higher than a threshold, the cleaning mode including increasing an amount of a fuel with cleaning component-air mixture flowing back from the combustion chamber to the intake port,
    wherein the mode controller prohibits the execution of the cleaning mode in the direct injection engine, on a condition that the cleaning component included in the fuel is lower than the threshold.

2. The engine control apparatus according to claim 1, wherein the mode controller causes the execution of the cleaning mode by advancing a start timing of injection of the fuel.

3. The engine control apparatus according to claim 1, wherein the intake system further includes an intake valve configured to cause the intake port to be open or closed, and wherein the mode controller causes the execution of the cleaning mode by postponing a close timing of the intake valve.

4. The engine control apparatus according to claim 3, wherein the mode controller causes the execution of the cleaning mode by advancing a start timing of injection of the fuel.

5. An engine control apparatus that controls a direct injection engine, the direct injection engine including a combustion chamber and an intake system, being able to execute a cleaning mode, and being configured to inject fuel into the combustion chamber, the intake system including an intake port that is in communication with the combustion chamber, and the cleaning mode including cleaning a deposit in the intake system, the engine control apparatus comprising:
  a cleaning component sensor provided in a fuel system and configured to detect a cleaning component included in the fuel, the fuel system including a fuel tank and an injector, and being configured to supply the fuel with the cleaning component therein to the combustion chamber, and
  a circuitry configured to cause execution of the cleaning mode by the direct injection engine, under a state in which the cleaning component included in the fuel is higher than a threshold, the cleaning mode including increasing an amount of a fuel with cleaning component-air mixture flowing back from the combustion chamber to the intake port.

* * * * *